May 28, 1940.  A. SWANSON  2,202,303

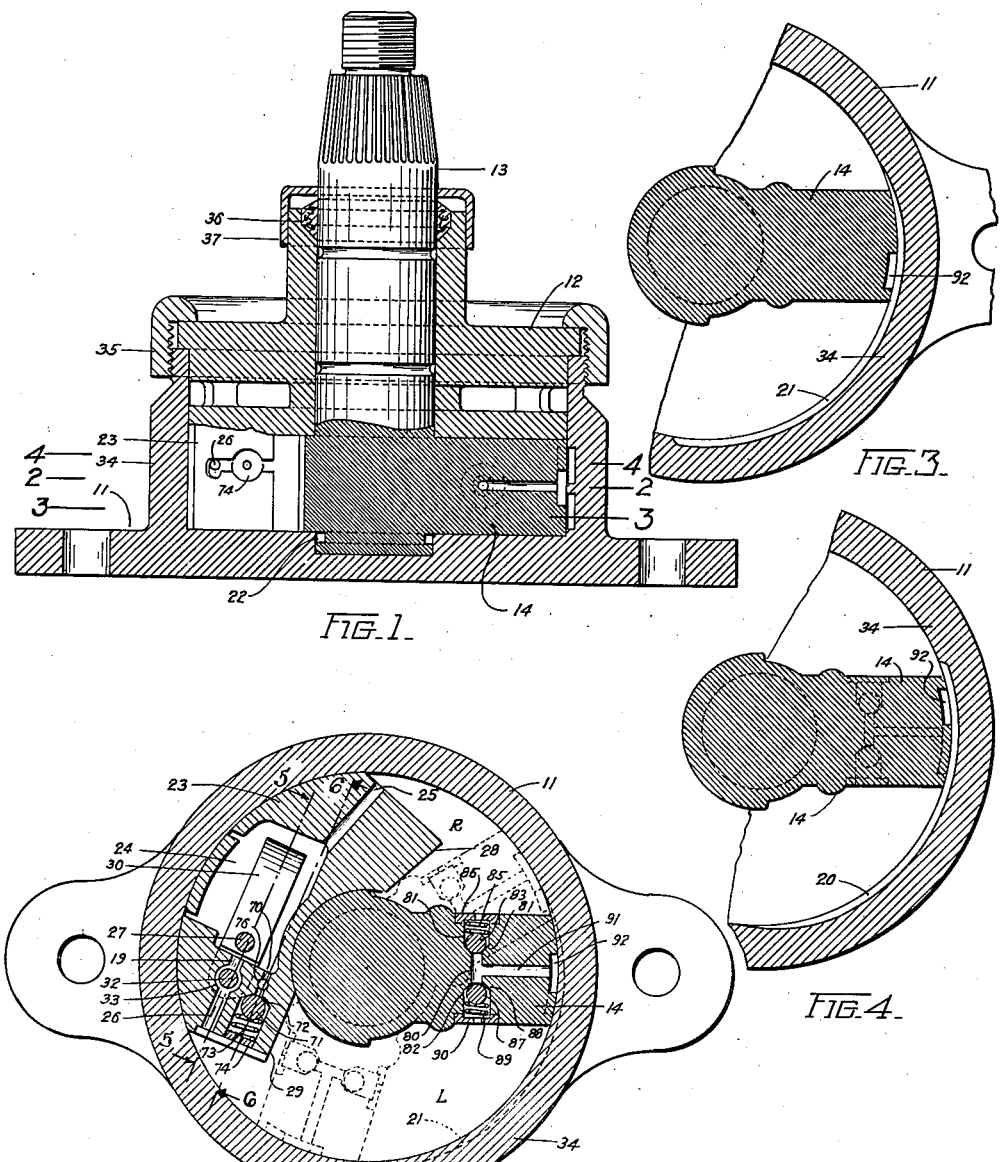

HYDRAULIC CHECKING MECHANISM

Filed July 1, 1939   2 Sheets-Sheet 2

ALFRED SWANSON
INVENTOR.

BY *[signature]*
ATTORNEY.

Patented May 28, 1940

2,202,303

UNITED STATES PATENT OFFICE 2,202,303

HYDRAULIC CHECKING MECHANISM

Alfred Swanson, Los Angeles, Calif.

Application July 1, 1939, Serial No. 282,441

10 Claims. (Cl. 16—82)

This invention relates to shock absorbers and more particularly to hydraulic checking mechanisms for controlling the rate of movement of a reciprocating door through any portion or all of its movements. One of the objects of the invention is to provide a shock absorber or check which interposes varying degrees of resistance at selected portions in the movement of doors, machine parts, and other mechanisms having reciprocative movements. Another object is to provide an hydraulic door check for sliding doors such as elevator doors by which the movement of the door near the completely closed position and/or the completely open position is gradually decelerated while the reverse movements are unretarded. Another object is to provide checks for sliding doors by which the motion of a door during the movement intermediate the decelerated closing position and the decelerated open position is relatively unretarded. Still another object of this invention is the provision of a check which will interpose different resistances on the reciprocating parts of a mechanism in each of its two directions of travel. These and other objects will be apparent from the description and the drawings in which Fig. 1 is a vertical cross-section partly in elevation showing one form of my shock absorber or check;

Fig. 2 is a horizontal section of a check taken on the line 2—2 of Fig. 1;

Fig. 3 is a partial section taken on the line 3—3 of Fig. 1;

Fig. 4 is a partial section taken on the line 4—4 of Fig. 1;

Figure 5:
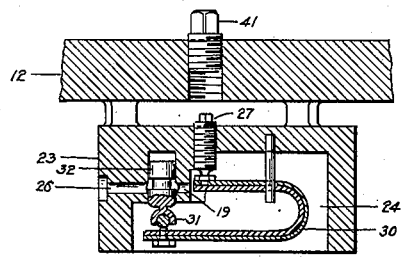
Fig. 5 is a partial section taken on the line 5—5 of Fig. 2.
Figure 6:
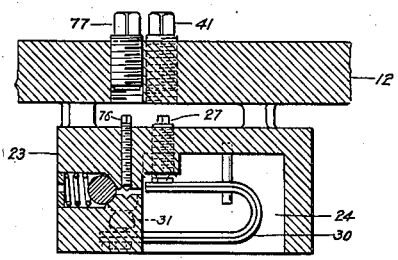
Fig. 6 is a partial section taken on the line 6—6 of Fig. 2.

Referring to the figures, the main casing and base is represented generally by 11 having cylindrical side walls 34 which together with the top plate 12 defines the working chamber, which is normally filled with a liquid. A shaft 13 upon which is fastened the rotary reciprocative piston 14 rotates in the seat 22 in the base 11, and is journaled in the top plate 12, with packing means 36 held by the cap 37 closely around the shaft 13 at its upper end to prevent leakage of the liquid. The top plate 12 is held in place relative to the base by the threaded collar 35. The exterior portion of the shaft 13 is shown fluted and threaded to adapt it for attachment to a lever arm 38 with which the check may be connected to a sliding door, or other reciprocative mechanism.

In the form shown, the working chamber is limited to a segment of the complete cylindrical space defined by the side walls 34 by a fixed block 23 whose radial side walls 28 and 29 define the limits of the piston movement. This block 23 as shown is an integral part of the top plate 12 although it may be a separate member fixed to the base or cylindrical side wall. Within the block 23 is a reservoir 24 which communicates with one (the right hand) portion R of the working chamber by a passageway 25 and with the other (the left hand) portion L of the working chamber by two ducts 26 and 70. Interposed in the duct 26 is an orifice 19 whose opening is controlled by the hand adjustment screw 27 which is adapted to raise and lower the position of the U-shaped thermostatic element 30 which in turn through the ball and socket joint 31 controls the position of the grooved cylinder 32 in its seat 33. Removal of plug 41 from the cover plate 12 gives access to the head of the screw 27. The bi-metallic thermostatic element 30 by expanding and contracting with the rise and fall of the temperature of the liquid in the reservoir automatically opens the orifice 19 more when the temperature is lower and restricts the orifice when the temperature is higher, thus compensating for the change in rate of flow of liquid through the orifice due to changes in viscosity with temperature. The other duct 70 from the reservoir 24 to the left hand side L of the working chamber is provided with a check valve consisting of a ball 71 held in its seat 72 by a light spring 73 and retainer 74. The size of the opening of this duct 70 is controlled by the hand operated needle valve 76 which may be manipulated when the instrument is assembled through the opening in the cover plate 12 by the removal of the plug 77.

At selected positions on the sliding contact area of the piston on the base, preferably in the cylindrical side wall, are cut by-pass groove or grooves. Referring specifically to Figures 1, 2, 3, and 4, two by-pass grooves 20 and 21 are cut in the cylindrical side wall on the inside of the working chamber. The upper groove 20, in the end terminating near the right hand portion of the working chamber, is gradually restricted in cross-sectional area until this reaches zero at its end. The opposite end of the groove 20 near the left hand portion of the working chamber has a less gradual decreasing cross-sectional area substantially to its end, i. e., is more abrupt. The groove 21 is reversed as to the cross-sectional area of its end portions, that is, the end nearest the left hand portion of the working chamber being gradually restricted in cross-sectional area and the end nearest the right hand portion of the working chamber being less gradually terminated. As shown, the gradual reduction in the cross-sectional areas at the ends of these grooves is attained by gradually decreasing the depth of the groove, however, this could also be accomplished by gradually decreasing the width of the groove. By gradual decrease, the combined cross-sectional area of the by-pass grooves in the manner described permits quick deceleration without jerking or "stuttering," and without restriction of the portion of the grooves through which liquid by-passes on the reverse or non-resistance stroke.

The piston 14 is provided with an aperture 80 extending from one working face to the other, each end of the aperture 80 being provided with a check valve 81 and 82. The check valve 81 on the right side has a ball 83, a seat for the ball, 84, a light spring 85 to hold the ball in place and a retaining clip 86. The left side check valve 82 has a ball 87, a seat 88, spring 89 and a retaining clip 90.

Communicating between the periphery of the piston and the aperture 80 is a hole 91 ending in an inlet 92 on the peripheral face of the piston. The inlet 92 consists of a groove extending from near the edge on the left hand side to near the edge on the right hand side of the working chamber and extending diagonally to cover both by-pass grooves 20 and 21 in the side wall 34 of the base 11 during the center or non-resistance area of the shock absorber, but adapted to communicate with only the unrestricted end of one groove near the last portion of the travel. One form of this inlet, particularly adapted for use on shock absorbers for sliding doors, is shown in Figure 7; other forms may be used for particular adaptations of the device, it being necessary that the most advanced portion of the inlet (for example, upper right part in Figure 7) pass over the groove having the gradually restricted terminal.

Figure 7:
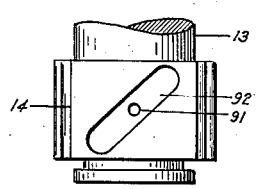
Fig. 7 is a peripheral end view of the piston shown in Fig. 1.
Figure 9:
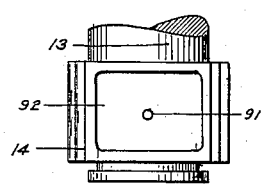
Fig. 9 is a peripheral end view of the piston shown in Fig. 8.
Figure 8:
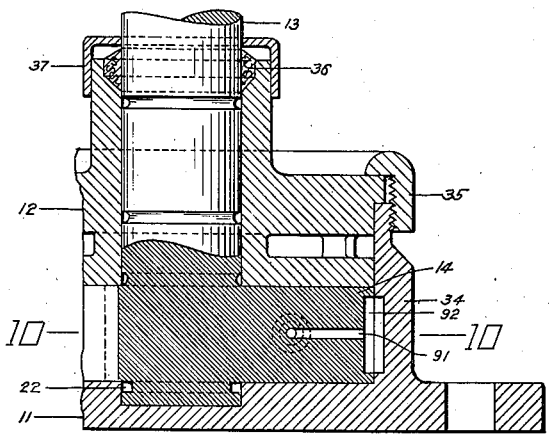
Fig. 8 is a vertical cross-section partly in elevation of a part showing another form of my check.
Figure 10:
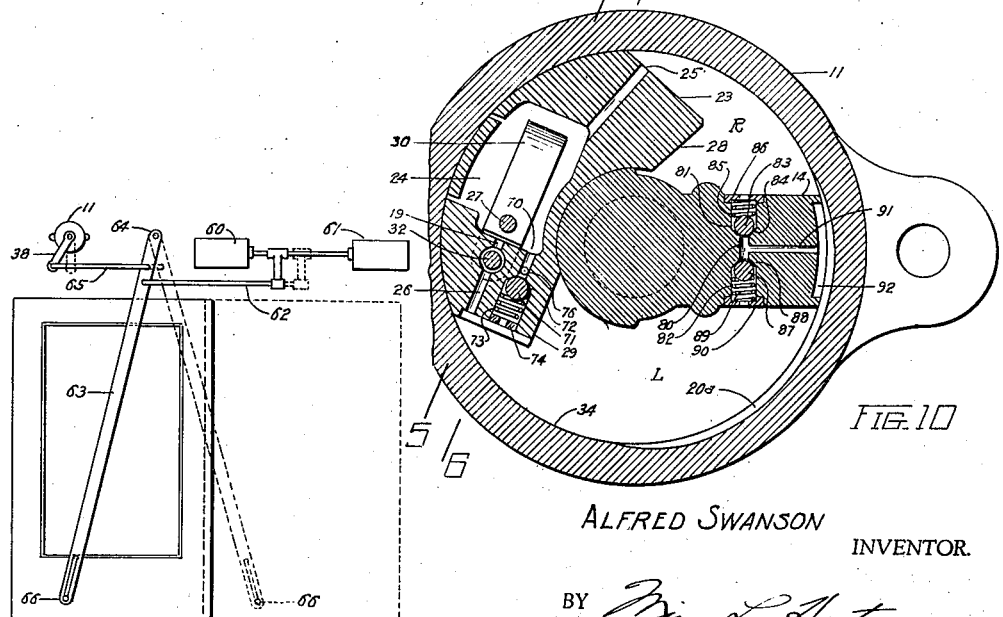
Fig. 10 is a horizontal cross-section taken on the line 10—10 of Fig. 8.

In the alternative form of my device shown in Figures 8, 9 and 10, a single groove 20A is provided in the cylindrical side wall of the base 11 and the inlet 92 on the face of the piston is correspondingly aligned, the forms shown in Figures 7 and 9 being illustrative. Where only one by-pass groove such as 20A is used, the cross-sectional area of the groove is gradually decreased toward both ends and the width of the inlet on the peripheral face of the piston is made sufficiently wide and deep so that the flow of liquid on the non-resistant stroke of the piston will not be restricted and thereby cause checking where no checking is wanted.

The by-pass grooves in the base, either in the cylindrical side walls or in the top or bottom plates of the working chamber may be disposed to control any portion or portions of the movement of the piston and the amount of friction introduced or relieved in any portion may be regulated by the cross-sectional area of the grooves or any portion of them, it being, of course, understood that the hole 91 and inlet 92 are correspondingly positioned on the sliding portion of the piston to co-act with the by-pass grooves or groove, where ever they may be placed.

Figure 11:
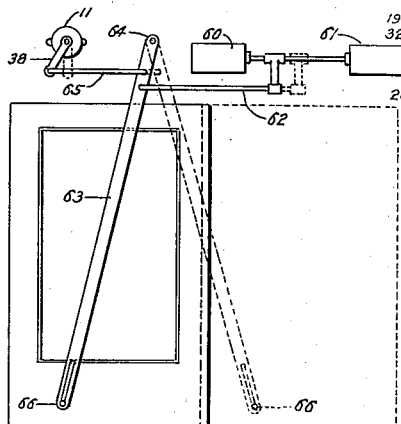
Fig. 11 shows diagrammatically one method of applying my check to the operation of a power operated sliding elevator door.

Figure 11 illustrates one method of using my improved check to control the operation of a sliding door such as an elevator door. The motive force for moving the door is supplied by any suitable means such as the double cylinder and piston arrangement indicated at 60 and 61 which is adapted to move the arm 62 horizontally. This arm 62 is pivotally attached to the long lever arm 63 pivoted at 64, the opposite end being attached to the door by a sliding pivotal attachment means 66. Also attached to the arm 63 is a lever 65 which is linked at its other end to the lever arm 38 which is reciprocatively rotated by the shaft 13 of my device by the oscillation of the piston. When the door is moved toward the right by means of fluid pressure exerted in the cylinder means represented by 60 and 61, the piston 14 in the shock absorber device is moved from left to right through the main central portion of travel with practically no checking action. Within the shock absorber the liquid in the working chamber at the beginning of the left to right stroke passes through the unrestricted end of the upper groove 20 into the inlet 92 through the hole 91, opens the check valve 82 by pushing the ball 83 out of its seat 84 against the slight pressure exerted by the spring 85, and the liquid enters the left hand portion L of the working chamber. A small part of the liquid may also pass through the passageway 25 to the auxiliary reservoir 24 through the thermostatically controlled orifice 19 and out through the duct 26 into the left hand portion of the working chamber. As the piston approaches the right hand end of its travel, the upper groove 20 gradually gets smaller and smaller in cross-sectional area, thus gradually increasing the resistance, until the forward edge of the piston end passes the ends of both grooves, at which time the liquid at the right hand side of the piston no longer by-passes around the end of the piston but is compressed in the right hand portion of the working chamber, its only outlets being through passageway 25 to reservoir 24 through the thermostatically controlled duct 26 and the ball checked duct 70, the orifices of both of these ducts being hand adjusted so that the movement of the door is decelerated at the desired rate. When the door and the check have reached the limit of their travel to the right and the door moved in the opposite direction from right to left, the liquid in the left hand portion L of the chamber flows through the lower groove 21 into the inlet 92 through the hole 91, unseats the ball 87 in the ball check valve 82 and flows freely into the right hand portion R of the working chamber. Some liquid is also forced through the thermostatically controlled orifice 19 of the duct 26 into the reservoir 24 and through the passageway into the right hand chamber R. None, however, can flow through the ball checked duct 70 because by liquid movement in this direction the ball 71 is seated and closes off the flow of liquid. As soon as the inlet 92 again covers both grooves, liquid may flow freely around the end of the piston through the grooves. When the piston approaches the restricted end of the lower groove 21 the flow of liquid around the end of the piston is gradually shut off until the piston edge reaches the end of the grooves. The liquid in the left hand portion L of the working chamber is put under pressure because the ball 83 in the check valve 82 in the piston is seated and the only escape of the liquid is through the orifice 19 of the duct 26.

Through movements of the liquid both from right to left or from left to right, the orifice 19 is automatically adjusted by the thermostat to compensate for changes of liquid in the reservoir 24, but this adjustment is the same for the flow in both directions. The regulator valve 76 in the ball check duct 70 permits adjustments for different rates of flow, and consequently different degrees of resistance, from left to right and right to left while retaining the advantages of a thermostatic control. The thermostatically controlled orifice being on the left hand side of the reservoir, there is more liquid to be compressed when the piston is in the compression area at the right side of the stroke than when it is in the left side of the stroke, consequently the resistance or checking effect in the two directions can never be identical if only a single thermostatically controlled orifice is provided. Since in both of the strokes of the piston all of the liquid is retarded in its flow mainly by the restricted orifice, it is necessary to compensate for the compression of the greater amount of liquid on the right hand side. The hand adjustment of the ball checked duct 70 permits the regulation of the amount of liquid passing from the reservoir to the left hand portion of the working chamber whereas in the movement of the liquid in the opposite direction no liquid passes through this ball checked duct but only through the orifice.

When the single groove 20A is provided as illustrated in Figure 8, the movement of the liquid in my shock absorber or check is analagous to that described for the arrangement using two grooves. The single groove is tapered in cross-sectional area at both ends, permitting gradual increase in the resistance approaching the compression zones, and allowing free relief on the back stroke out of the compression areas.

Although I have shown and described certain embodiments of my invention, many modifications are possible and my invention therefore is not to be restricted except as necessitated by the prior art and by the spirit of the appended claims.

I claim:

1. In an hydraulic shock absorber, a reciprocative rotary piston moveable within a working chamber, a fixed block adjacent said working chamber and two manually adjustable valved ducts communicating through said block between the working chamber on one side of said piston and the working chamber on the other side of said piston, one of said ducts having a check valve to permit the flow of liquid in one direction only.

2. In an hydraulic shock absorber, a casing having a working chamber, a single reciprocative rotary piston moveable within said chamber, an aperture through said piston having check valves at either end adapted to prevent inflow of liquid, a hole communicating between said aperture and an inlet on said piston having sliding contact with said casing, said casing having a groove in communication with said inlet during a portion of the movement of said piston, a fixed block adjacent said working chamber, a reservoir in said block, a passageway communicating between the reservoir and the working chamber on one side of said piston, and two manually adjustable valved ducts communicating between the reservoir and the working chamber on the other side of said piston, one of said ducts having a check valve to permit the flow of liquid in one direction only.

3. In a hydraulic shock absorber, a casing having a working chamber, a single reciprocative rotary piston moveable within said chamber, an aperture through said piston having check valves at either end adapted to prevent inflow of liquid, a hole communicating between said aperture and an inlet on said piston having sliding contact with said casing, a groove in said casing in communication with said inlet during a portion of the movement of said piston, said groove near its ends being tapered to gradually restrict the flow of liquid between the hole and the groove, a fixed block adjacent said working chamber, a reservoir in said block, a passageway communicating between the reservoir and the working chamber on one side of said piston, and two manually adjustable valved ducts communicating between the reservoir and the working chamber on the other side of said piston, one of said ducts having a check valve to permit the flow of liquid in one direction only.

4. In an hydraulic shock absorber having a reciprocative rotary piston moveable within a working chamber, a reservoir for liquid adjacent said working chamber, a passageway communicating between the reservoir and the working chamber on one side of said piston, and two ducts communicating between the reservoir and the working chamber on the other side of said piston, one of said ducts having a manually adjustable orifice and also thermostatic means for changing the size of said orifice to compensate for temperature changes in the liquid in said reservoir, the other of said ducts having a check valve to permit the flow of liquid only from the working chamber to the said reservoir and also having a manually adjustable valve for controlling the flow of liquid therethrough.

5. In an hydraulic shock absorber, a casing having a working chamber, a single reciprocative rotary piston moveable within said chamber, an aperture through said piston having check valves at either end adapted to prevent inflow of liquid, a hole communicating between said aperture and an inlet on said piston having sliding contact with said casing, said casing having a groove in communication with said inlet during a portion of the movement of said piston, a reservoir for liquid adjacent said working chamber, a passageway communicating between the reservoir and the working chamber on one side of said piston, and two ducts communicating between the reservoir and the working chamber on the other side of said piston, one of said ducts having an adjustable orifice and also thermostatic means for changing the size of said orifice to compensate for temperature changes in the liquid, the other of said ducts having a check valve to permit the flow of liquid only from the working chamber to the said reservoir together with a manually adjustable valve for controlling the flow of liquid therethrough.

6. In an hydraulic shock absorber, a casing having a working chamber, a single reciprocative rotary piston movable within said chamber, an aperture through said piston having check valves at either end adapted to prevent inflow of liquid, a hole communicating between said aperture and an inlet on said piston having sliding contact with said casing, a groove in said casing in communication with said inlet during a portion of the movement of said piston, said groove near its ends being tapered to gradually restrict the flow of liquid between the hole and the groove, a reservoir for liquid adjacent said working chamber, a passageway communicating between the reservoir and the working chamber on one side of said piston, and two ducts communicating between the reservoir and the working chamber on the other side of said piston, one of said ducts having an adjustable orifice and also thermostatic means for changing the size of said orifice to compensate for temperature changes in the liquid, the other of said ducts having a check valve to permit the flow of liquid only from the working chamber to said reservoir together with a manually adjustable valve for controlling the flow of liquid therethrough.

7. A shock absorber comprising, in combination, a casing having a working chamber therein, a piston in said working chamber movable toward and from the walls defining opposite ends of said chamber, an aperture through said piston having check valves at either end adapted to prevent inflow of liquid, a hole communicating between said aperture and an inlet in the periphery of said piston said inlet having a connecting channel disposed on the peripheral face of said piston and extending nearly to the working face edges thereof, said casing in its peripheral side wall having two grooves in communication with said inlet during a portion of the movement of said piston, the said grooves at their opposite ends being adapted to gradually restrict the flow of liquid between the inlet and the groove as the piston is reciprocated, a reservoir provided between such walls and located intermediate the ends of the working chamber, a passageway communicating with one end of the working chamber and with said reservoir, two ducts communicating with the opposite end of the working chamber and with said reservoir, a sliding valve controlling one of the aforesaid ducts, and a thermostat adjustably connected with said sliding valve.

8. In an hydraulic shock absorber of the type having a rotary piston in sliding contact with the walls of a working chamber, a by-passing groove for hydraulic fluid in a portion of the sliding contact portion of the wall having a tapered cross-sectional area in its end portion, of such nature that the flow of fluid through the groove around the piston is very gradually increased or decreased as the piston passes over said groove.

9. In an hydraulic shock absorber of the type having a rotary piston with ducts from either side of the piston terminating in a common orifice on a face in sliding contact with the walls of a working chamber, two by-pass grooves for hydraulic fluid in a portion of the wall in sliding contact with the piston over which the common orifice may pass, each of said grooves being tapered at one end and terminated abruptly at the other end and oppositely disposed endwise to each other.

10. In a piston for an hydraulic shock absorber having ducts from the two pressure sides of the piston terminating in a sliding contact portion movable over a working chamber wall having by-pass grooves, a common enlarged orifice for said ducts having boundaries extending close to the pressure side walls of the piston.

ALFRED SWANSON.